(12) United States Patent
Klein et al.

(10) Patent No.: US 6,677,264 B1
(45) Date of Patent: Jan. 13, 2004

(54) CATALYST FOR CLEANING UP THE EXHAUST GASES OF A DIESEL ENGINE

(75) Inventors: Harald Klein, Bessenbach (DE); Wolfgang Strehlau, Dossenheim (DE); Egbert Lox, Hanau (DE); Thomas Kreuzer, Karben (DE); Wilfried Müller, Karben (DE)

(73) Assignee: Degussa-Huls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/442,633

(22) Filed: Nov. 18, 1999

(30) Foreign Application Priority Data

Nov. 27, 1998 (DE) .......................................... 198 54 794

(51) Int. Cl.$^7$ .......................... B01J 21/16; B01J 29/06; B01J 23/40; B01J 23/42; B01J 23/60
(52) U.S. Cl. ........................ 502/74; 502/327; 502/329; 502/330; 502/331; 502/339; 502/326; 502/527.12; 502/66; 502/77; 502/78; 502/79
(58) Field of Search ................................ 502/327, 328, 502/329, 330, 331, 332, 333, 334, 339, 349, 350, 351, 355, 439, 303, 304, 340, 341, 342, 344, 345, 346, 527.12; 423/213.5, 239.1, 239.2

(56) References Cited

U.S. PATENT DOCUMENTS

| | | | |
|---|---|---|---|
| 5,057,007 A | | 10/1991 | Andringa et al. |
| 5,179,059 A | * | 1/1993 | Domesle et al. ............. 502/303 |
| 5,292,696 A | | 3/1994 | Ito et al. |
| 5,514,354 A | | 5/1996 | Domesle et al. |
| 5,677,258 A | | 10/1997 | Kurokawa et al. |
| 5,702,675 A | * | 12/1997 | Takeshima et al. ....... 423/213.5 |
| 5,727,385 A | * | 3/1998 | Hepburn ...................... 60/297 |
| 5,758,489 A | * | 6/1998 | Hepburn et al. ............... 60/274 |
| 5,762,892 A | * | 6/1998 | Kasahara et al. ......... 423/213.5 |
| 5,780,126 A | * | 7/1998 | Smith et al. ................ 428/34.5 |
| 5,795,840 A | | 8/1998 | Takami et al. |
| 5,804,152 A | * | 9/1998 | Miyoshi et al. .......... 423/213.5 |
| 5,884,473 A | * | 3/1999 | Noda et al. .................... 60/274 |
| 5,958,826 A | | 9/1999 | Kurokawa et al. |
| 5,972,830 A | * | 10/1999 | Yoshida et al. .............. 502/304 |
| 6,066,587 A | * | 5/2000 | Kurokawa et al. ............ 502/66 |
| 6,159,897 A | * | 12/2000 | Suzuki et al. ................ 502/351 |

FOREIGN PATENT DOCUMENTS

| | | |
|---|---|---|
| DE | 39 40 758 | 12/1989 |
| DE | 19617123 | 10/1996 |
| DE | 19617124 | 10/1996 |
| DE | 19614540 | 10/1997 |
| DE | 19742705 | 4/1998 |
| EP | 0671211 | 9/1995 |
| EP | 716876 | 6/1996 |
| EP | 749774 | 12/1996 |

* cited by examiner

*Primary Examiner*—Cam N. Nguyen
(74) *Attorney, Agent, or Firm*—Kalow & Springut LLP

(57) ABSTRACT

A catalyst for purifying exhaust gases of a diesel engine. The catalyst contains two functional layers superimposed on an inert supporting body, whereby the first layer, which is situated directly on the supporting body, has a nitrogen oxide storage function and the second layer, which is in direct contact with the exhaust gas, has a catalytic function. The second functional layer additionally has a hydrocarbon-storage function and its catalytic function is provided by catalytically active noble metals of the platinum group which are deposited in highly dispersed form on finely divided, acidic carrier materials. Nitrogen oxides in the oxygen-rich exhaust gas of a diesel engine can be converted with optimal utilization of the reductive constituents contained in the exhaust gas. For this purpose, no reducing agents going beyond the reductive components (carbon monoxide and hydrocarbons) which are contained as a consequence of incomplete combustion need to be added to the exhaust gas. Nevertheless, rates of conversion in respect of the nitrogen oxides are obtained, averaged over practical driving cycles, which lie distinctly above the rates of conversion of conventional reduction catalysts.

9 Claims, 2 Drawing Sheets

CATALYST FOR CLEANING UP THE EXHAUST GASES OF A DIESEL ENGINE

INTRODUCTION AND BACKGROUND

The present invention relates to a catalyst for cleaning up the exhaust gases of a diesel engine. With the catalyst according to the invention the nitrogen oxides in the oxygen-rich exhaust gas of a diesel engine can be converted with optimal utilization of the reductive constituents contained in the exhaust gas.

Diesel engines emit exhaust gases that contain, besides unconsumed oxygen and harmless combustion products such as water and carbon dioxide, additional substances that are harmful and which endanger human health and pollute the environment. These include carbon monoxide CO, non-combusted hydrocarbons HC, nitrogen oxides $NO_x$ and particles. The nitrogen oxides are formed from the nitrogen of the combustion air during combustion or arise out of nitrogenous compounds in the fuel. Depending on the operating point of the engine, they consist of nitrogen monoxide NO in a proportion amounting to about 50 to 90 vol.-%. Furthermore, depending on the sulfur content of the fuel, the exhaust gas of internal combustion engines also contains sulfur dioxide.

With a view to keeping the air clean, certain upper limits for the emission of these harmful substances have been prescribed by the legislature. The limits are revised downwards from time to time, in accordance with the technical possibilities, in order to lessen the emissions of harmful substances. With a view to checking the conversion of harmful substances by exhaust gas emission control systems in a way approximating to practical reality, various test cycles have been established which simulate frequently occurring driving conditions.

The test cycle that is recognized in Europe in respect of a vehicle is designated as the MVEG-A cycle (Motor Vehicle Emission Group) and consists of an urban driving portion (ECE) and an extra-urban portion (EUDC). In this connection the vehicle to be examined covers the appropriate driving cycle on a roller dynamometer. The centrifugal-mass flywheels of the roller dynamometer constitute a collective load and simulate the weight of the vehicle. During the driving cycle the gaseous harmful substances which are emitted are measured and added up by means of standard analytical processes (HC: with a flame ionization detector (FID), CO: with infrared spectroscopy (IR), $NO_x$: with a chemiluminescence detector (CLD)), so that the emissions of harmful substances of the entire cycle are available in the form of grams of harmful substance per kilometer travelled. These emissions can be directly compared with the limits specified by legislation.

With respect to their exhaust gas composition the present day internal combustion engines can be subdivided into two classes. On the one hand there are the conventional Otto (internal combustion) engines, the exhaust gas of which is composed substantially stoichiometrically, and on the other hand there are the diesel engines and lean burn Otto engines, the exhaust gas of which contains an excess of oxygen.

The exhaust gas of conventional Otto engines also exhibits, besides the stated harmful substances, an oxygen content of about 0.7 vol.-%. It is stoichiometrically composed; that is to say, oxidative and reductive components of the exhaust gas balance one another and can be converted simultaneously and almost completely with so-called three-way catalysts into the harmless components carbon dioxide, water and nitrogen. By way of catalytically active components, three-way catalysts contain on high surface area carrier oxides, in addition to platinum and/or palladium, also rhodium, which particularly favours the selective reduction of the nitrogen oxides to nitrogen by making use of carbon monoxide and non-combusted hydrocarbons as reducing agents. A prerequisite for simultaneous conversion of the three harmful substances by means of a three-way catalyst is the regulation of the air/fuel ratio supplied to the engine to the stoichiometric value. The latter amounts to 14.6 in the case of conventional fuels. Accordingly, 14.6 kilograms of air are needed for complete combustion of 1 kilogram of fuel.

In contrast, the exhaust gas of diesel engines and of lean burn Otto engines contains a high oxygen content amounting to about 6 to 20 vol.-%, since these engines are operated with lean air/fuel ratios. A major problem with these engines is constituted by the emission of the nitrogen oxides. On account of the high oxygen content of the exhaust gas it is not possible to convert the nitrogen oxides in accordance with the established three-way process using carbon monoxide and hydrocarbons as reducing agents. Instead, the oxidation of carbon monoxide and hydrocarbons in the oxygen-rich exhaust gas is preferred.

Frequently, therefore, the exhaust gases of these engines are only purified oxidatively with so-called oxidation catalysts; that is to say, carbon monoxide and hydrocarbons are oxidized on a catalyst by the oxygen in the exhaust gas to form water and carbon dioxide. Such a catalyst is described in DE 39 40 758 C1, for example. It is distinguished by a high catalytic activity in respect of the oxidation of carbon monoxide and hydrocarbons, whereas further oxidation of nitrogen monoxide to nitrogen dioxide and of sulfur dioxide to sulfur trioxide is largely suppressed. By this means, the formation of sulfates which could contaminate the catalysts that are used is also lessened. By way of catalytically active components the catalyst contains, on high surface area carrier oxides such as aluminum oxide, titanium oxide and silicon dioxide, platinum and/or palladium, which are modified in their catalytic activity as a result of additions of vanadium oxide in such a way that scarcely any further oxidation of nitrogen monoxide and sulfur dioxide is to be observed.

There have been various suggested solutions with a view to lessening the nitrogen oxides in the exhaust gas of these engines. In the case of so-called selective catalytic reduction (SCR) the nitrogen oxides in the exhaust gas are selectively reduced on an SCR catalyst by addition of reducing agents to the exhaust gas. The fuel itself can be used by way of reducing agent. Optimal results are achieved with ammonia as reducing agent, which, for example, can be generated on board the vehicle by hydrolysis of urea. Such a process is described in DE 42 03 807 A1. A suitable SCR catalyst is mentioned in EP 0 410 440 B1. It consists of an intimate mixture of the oxides of titanium, iron, vanadium, molybdenum, tungsten and various other additives.

Selective catalytic reduction can be employed economically only in the case of large diesel engines in trucks. Therefore the use of so-called nitrogen oxide storage catalysts has been proposed in recent years for the reduction of the nitrogen oxides in the exhaust gas of lean burn Otto engines. In this case the nitrogen oxides are oxidized to a higher state of oxidation on the storage catalyst by platinum group metals to form nitrogen dioxide and are stored in the form of nitrates by a basic storage material. After the storage capacity of the catalyst has been exhausted, it has to be regenerated. Regeneration is initiated by switching the operation of the engine from a lean air/fuel mixture to a rich, that is to say reducing, air/fuel mixture. In the reducing exhaust gas atmosphere the stored nitrates are decomposed, releasing nitrogen oxides which are converted into nitrogen under the reducing exhaust gas conditions on the platinum group metals. Accordingly, with this process, as also with the SCR process, reducing agents in the form of additional fuel are actively employed. To this end, suitable engine electronics are required which switch over periodically from lean running mode to rich running mode.

EP 0 669 157 A1 describes such a system. By way of storage material for the nitrogen oxides, use is made of basic materials such as alkali metal oxides, alkaline earth metal oxides and rare earth oxides. The storage catalyst additionally contains platinum and/or palladium on a high surface area carrier oxide.

With a view to improving the purification of exhaust gas and with a view to increasing the resistance to sulfur, various combinations of storage catalysts with other catalysts have become known. For instance, EP 0 716 876 A1 describes a catalyst which exhibits two porous carrier layers on a supporting body. The first carrier layer contains barium by way of storage material for the nitrogen oxides as well as palladium. The second carrier layer is situated on the first carrier layer and contains platinum which oxidizes nitrogen monoxide in the lean exhaust gas to nitrogen dioxide and thereby improves the storage of the nitrogen oxides by the first layer. In the stoichiometrically composed or rich exhaust gas the nitrogen oxides which are stored in the first layer are desorbed and reduced by palladium and platinum to elemental nitrogen. Palladium in the first layer is intended to protect the storage material against contamination by sulfur dioxide. By way of carrier materials for the first and second carrier layers, EP 0 716 876 A1 names aluminum oxide, silicon dioxide, aluminum silicate, titanium oxide and the like. Aluminum oxide is preferably employed as carrier material for both carrier layers.

With a view to improving the resistance to sulfur of the storage material, EP 0 664 147 A2 likewise describes a catalytic converter which in the direction of flow of the exhaust gas exhibits, firstly, a first catalyst consisting of a noble metal on a porous, acidic carrier material, a second catalyst consisting of a storage material for nitrogen oxides and a third catalyst consisting of a noble metal on a porous carrier material. The sulfur dioxide contained in the lean exhaust gas is neither adsorbed nor oxidized by the first catalyst and can therefore pass through the second catalyst without the formation of sulfates. In the rich or stoichiometrically composed exhaust gas the stored nitrogen oxides are released by the second catalyst and are reduced on the third catalyst to elemental nitrogen. By way of porous, acidic carrier materials for the first catalyst, $SiO_2$, $ZrO_2$, $SiO_2$-$Al_2O_3$ and $TiO_2$ are proposed.

WO 97/02886 describes a composition for the conversion of the nitrogen oxides in exhaust gases, which contains, closely adjacent to one another, a catalyst for the conversion of the nitrogen oxides and a material sorbing the nitrogen oxides. The catalyst for the conversion of the nitrogen oxides exhibits a highly dispersed platinum metal component on a first carrier material. The material sorbing the nitrogen oxides contains a basic metal oxide which is separated from the platinum group metal component. In a preferred embodiment, the catalyst for the conversion of the nitrogen oxides is applied in the form of a first coating on a supporting body. In this case the material sorbing the nitrogen oxides is applied onto the first coating in the form of a second coating. The two layers may also be interchanged.

Metal oxides, metal hydroxides, metal carbonates and metal mixed oxides are described by way of storage compounds. The metals may be lithium, sodium, potassium, rubidium, caesium, magnesium, calcium, strontium or barium. The material sorbing the nitrogen oxides may contain, with a view to protection against contamination by sulfur, a component absorbing sulfur, preferably cerium oxide. This cerium oxide may be present in the form of particles alongside the particles of the storage material or may be dispersed in the nitrogen oxide storage compound.

With a view to removing the nitrogen oxides from the exhaust gases with the catalyst arrangement according to WO 97/02886, the composition of the exhaust gas is switched back and forth periodically between lean and stoichiometric, or—to be more exact—rich, by appropriate control of the air/fuel ratio.

WO 97/43031 proposes a process for removing the nitrogen oxides from the exhaust gas of, in particular, diesel engines. In this case the exhaust gas is firstly conveyed over a nitrogen oxide storage components and subsequently over a nitrogen oxide reduction catalyst. The nitrogen oxide storage component contains a combination of an oxidation catalyst and a storage material. Upstream of the nitrogen-oxide storage component, hydrocarbons are periodically injected through a nozzle into the exhaust gas in order to desorb the sorbed nitrogen oxides thermally. Without further measures this results in a mean conversion of nitrogen oxide amounting to zero. In addition, therefore, upstream of the reduction catalyst hydrocarbons must again be injected through a nozzle into the exhaust gas in order to obtain a net conversion of the nitrogen oxides.

According to WO 97/43031, the hydrocarbons which are injected through a nozzle upstream of the nitrogen oxide storage components are combusted on the oxidation catalyst of the nitrogen oxide storage component. Their quantity is such that the composition of the exhaust gas remains lean but the heat that is released in the course of combustion on the nitrogen oxide storage component is sufficient to desorb the stored nitrogen oxides thermally.

Accordingly, the known processes for operating storage catalysts all require a periodic raising of the hydrocarbon content of the exhaust gas, in order either to decompose the stored nitrogen oxides under rich or stoichiometric exhaust gas conditions or to desorb them thermally by increasing the temperature on the storage catalyst. Raising of the hydrocarbon content of the exhaust gas is effected in this case either by diminishing the air/fuel ratio supplied to the engine or by injecting fuel into the exhaust system through a nozzle downstream of the engine.

To the extent that they require an enrichment of the air/fuel mixture, these active processes for lessening the nitrogen oxide emissions of lean burn engines are unsuitable for use in diesel engines, since the latter operate flawlessly only with a constantly lean air/fuel mixture. By virtue of the enrichment of the air/fuel mixture or by virtue of the injection of fuel through a nozzle into the exhaust gas, the active processes result in an increased consumption of fuel.

The increased consumption of fuel should be avoidable, particularly in the case of diesel engines, since these engines exhibit relatively low nitrogen oxide emissions. This is because the non-combusted hydrocarbons, carbon monoxide and hydrogen which are still contained in the exhaust gas of diesel engines represent, on average, a sufficient quantity of reducing agents in order largely to reduce the low nitrogen oxide emissions.

In the case of diesel engines, therefore, attempts are made to improve the diminution of the nitrogen oxides also without enriching the exhaust gas by using only the reductive constituents that are contained in the exhaust gas in any case. A suitable catalyst for this is described in DE 196 14 540. On account of the low selectivity of the reduction of nitrogen oxide and by reason of the competing direct oxidation of the reductive constituents by the high oxygen content of the exhaust gas, the achievable degrees of conversion in this case are low. Only under optimal conditions, that is to say in the case of a uniformly high proportion of hydrocarbons in the exhaust gas, are rates of conversion of 60% achieved. Over the so-called MVEG-A test cycle, however, such a catalyst only permits a conversion of about 14%.

An object of the present invention is therefore to find a catalyst for cleaning up the continuously lean exhaust gas of diesel engines, which enables better utilization of the reductive components contained in the exhaust gas for the reduction of the nitrogen oxides and in this way results in a higher reduction of nitrogen oxide, averaged over the driving cycles occurring in practice, than known reduction catalysts.

SUMMARY OF THE INVENTION

The above and other objects of the invention can be achieved by means of a catalyst for cleaning up the exhaust gases of a diesel engine, which contains two functional layers superimposed on an inert supporting body, whereby the first layer, which is situated directly on the supporting body, has a nitrogen oxide storage function and the second layer, which is in direct contact with the exhaust gas, has a catalytic function. A feature of the invention is that the second functional layer of the catalyst additionally has a hydrocarbon-storage function and its catalytic function is provided by catalytically active noble metals of the platinum group which are deposited in highly dispersed form on finely divided, acidic carrier materials.

Within the scope of this invention, the term "functional layers" is to be understood to mean dispersion coatings on an inert supporting body which are able to change the chemical composition of an exhaust gas streaming past. The changes may consist in certain exhaust gas components being removed, at least temporarily, from the exhaust gas as a result of adsorption on constituents of the functional layers. Thus storage materials for nitrogen oxides are known that store the nitrogen oxides from the exhaust gas in the form of nitrates. Similarly, zeolites are known for the storage of hydrocarbons contained in the exhaust gas.

A further influence on the chemical composition of an exhaust gas streaming past resides in that certain harmful substances with other components of the exhaust gas are converted into harmless products upon contact with the constituents of the functional layer. This catalytic function is preferably provided by the noble metals of the platinum group, in particular by platinum, palladium, rhodium and iridium, which, with a view to full display of their catalytic activity, are deposited in highly dispersed form on finely divided support materials. Their catalytic activity can be influenced by addition of so-called promoters. In this connection it is a question, for the most part, of compounds of base metals.

With a view to characterizing the type of the catalytic activity, mention is frequently made of oxidation catalysts, reduction catalysts or three-way catalysts. However, these three catalytic functions cannot be clearly separated from one another. The function that actually expresses itself distinctly for a given composition of the functional layer also depends on the composition of the exhaust gas. A three-way catalyst can only convert carbon monoxide, hydrocarbons and nitrogen oxides simultaneously when the exhaust gas is composed stoichiometrically. In order that a so-called reduction catalyst can display its reducing activity, the exhaust gas has to contain enough reducing components; that is to say, carbon monoxide, hydrocarbons and hydrogen. The reducing components are then oxidized in the process.

Within the scope of this invention, the term "a finely divided material" is to be understood to mean a pulverulent material which is introduced as such into the catalyst. In the English language patent literature the term "bulk material" or "particulate material" is used for this. These materials are frequently employed as support materials for catalytically active components or other highly dispersed constituents of the catalyst. For this purpose the support materials have to exhibit a high specific surface area (also BET surface areas measured in accordance with DIN 66132, for example) for the acceptance of these components. Within the scope of this invention, the finely divided materials are designated as high surface area materials if their specific surface area amounts to more than 10 $m^2/g$.

The highly dispersed materials are to be distinguished from the finely divided materials. Highly dispersed materials may, for example, be deposited on finely divided, high surface area support materials by impregnation. To this end, the support materials are impregnated with, as a rule, water-soluble precursor compounds of the highly dispersed materials. By means of an appropriate temperature treatment the precursor compounds are then transformed into the highly dispersed materials. The particle size of these highly dispersed materials ranges from about 5 to 50 nm.

Within the scope of this invention, the term "storage components" is used to designate the elements of the alkali metals and alkaline earth metals. In this connection it is preferably a question of potassium, rubidium, caesium, magnesium, calcium, strontium and barium. They form strongly basic oxides which are able to bind the nitrogen oxides. The oxides of the storage components are therefore also designated as storage compounds or active storage compounds. But the term "storage compound" are used herein is also to be understood to mean the products of reaction of the oxides with air or with the exhaust gas components to form carbonates and hydroxides, which are likewise capable of storing nitrogen oxides. The storage capability of the storage compounds is generally the greater, the stronger their basicity.

The storage materials are to be distinguished from the storage compounds. In the case of the storage materials it is a question of support-based storage compounds; that is to say, of storage compounds which are deposited in highly dispersed form on suitable support materials. But, within the scope of this invention, storage compounds which are present in finely divided form are also designated as storage materials.

BRIEF DESCRIPTION OF DRAWINGS

The present invention will be elucidated in still more detail on the basis of the following Figures, wherein.

DETAILED DESCRIPTION OF INVENTION

Figure 1:
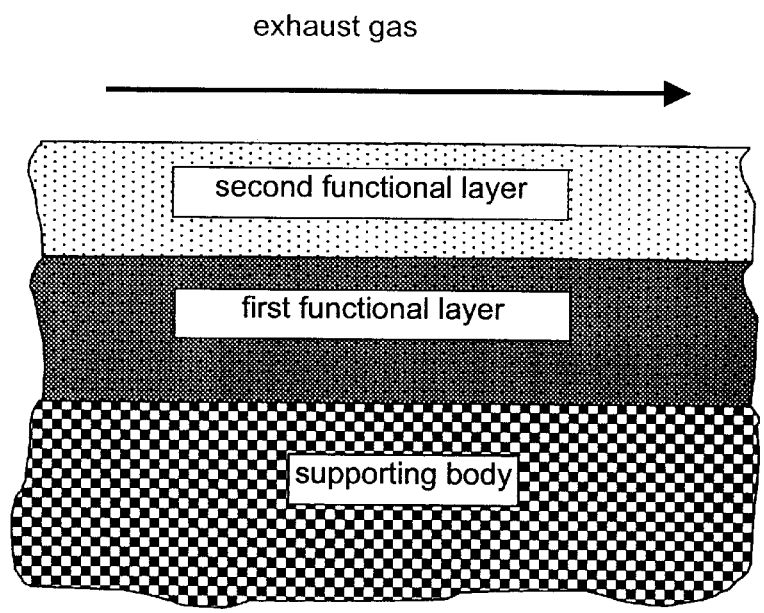
FIG. 1 is a schematic diagram of a layered structure of the catalyst according to the invention.

The catalyst according to the invention exhibits, above a first functional layer which has a nitrogen oxide storing function, a second functional layer which is both catalytically active and able to absorb the hydrocarbons contained in the lean exhaust gas. In this connection it is essential for the function of the catalyst according to the invention that the support materials for the catalytically active components are acidic carrier materials.

Suitable acidic support materials for the catalytically active components of the second functional layer are, for example, aluminum silicates, silicon dioxide, titanium oxide and zirconium oxide. Aluminum oxide is less suitable as support material in the second functional layer on account of its amphoteric character and its low acidity. Aluminum silicates with a silicon dioxide content from 1 to 40 wt.-%, relative to the total weight of the aluminum silicate, have proved to be particularly useful as support materials for the present invention. By way of catalytically active components, platinum and/or palladium are particularly suitable. Preferably, platinum is used.

With a view to reinforcing the acidic character of the second functional layer and with a view to storing hydrocarbons, zeolites in the acidic H-form having a modulus (molar ratio of silicon dioxide to aluminum oxide) of more than 20 are employed.

Essential for the effect of the catalyst according to the invention is the enrichment of nitrogen oxides and hydrocarbons in the catalyst in close proximity to the catalytically active centers. This results in a distinct increase in activity in comparison with pure oxidation catalysts and pure storage catalysts. The enrichment is effected by the nitrogen oxide storage materials in the first layer and by the hydrocarbon storage materials in the second layer. The macroscopically measurable desorption temperatures of the two adsorber materials are very different, at about 200° C. for the hydrocarbons and at about 400° C. for the nitrogen oxides. But also below the macroscopic desorption temperature of the nitrogen oxides of 400° C., microscopically adsorption and desorption processes continually occur that result in reduction of the nitrogen oxides with the simultaneously released hydrocarbons at the catalytically active centers and consequently in removal of the nitrogen oxides from the adsorption/desorption equilibrium.

The processes that have been described are favoured if the exhaust gas temperature lies below the macroscopic desorption temperature of the nitrogen oxides. A forced, thermal desorption of the nitrogen oxides at exhaust gas temperatures above about 400° C. is undesirable, since sufficient hydrocarbons would then no longer be available for the reduction.

This low temperature range is accommodated by the fact that modern, direct injection diesel engines, even in the event of high loading, rarely exhibit exhaust gas temperatures above 350 to 400° C. During the predominant duration of the operational states of these diesel engines their exhaust gas temperatures accordingly lie below 400° C. In the partial-load range these engines even exhibit exhaust gas temperatures only between 100 and 250° C. But also in the case of conventional diesel engines with higher exhaust gas temperatures the catalyst according to the invention can be employed if it is arranged at a location remote from the engine in the exhaust system, where the temperature of the exhaust gas is cooled appropriately.

For the second functional layer, use is made of zeolites, on their own or in a mixture, that are present in the acidic H-form and that exhibit a molar ratio (modulus) of silicon dioxide to aluminum oxide of more than 20. Particularly suitable are de-aluminized Y-zeolite, zeolite ZSM5 or de-aluminized mordenite.

The process according to the invention utilizes the microscopic adsorption and desorption processes of the nitrogen oxides at low temperatures. This behaviour is favoured by the use of nitrogen oxide storage materials that bind the nitrogen oxides only adsorptively.

The known concepts of the nitrogen oxide storage catalysts, on the other hand, pursue a different path. They are essentially based on the fact that the nitrogen oxides are stored in the form of nitrates as a result of reaction with the storage materials. With a view to decomposing these nitrates, there are two possibilities. On the one hand, the exhaust gas composition can be switched over from lean to rich or; to be more exact, stoichiometric. Under these exhaust gas conditions the nitrates are already decomposed at temperatures around 400° C. However, this possibility is eliminated on account of the constantly lean air/fuel ratio of diesel engines. On the other hand, a thermal decomposition of the nitrates under lean exhaust gas conditions is possible. For this purpose, however, temperatures above 400° C. are necessary.

In the catalyst according to the invention, on the other hand, the predominant portion of the nitrogen oxides in the first functional layer is principally adsorbed only loosely in the form of nitrogen monoxide. A prerequisite for this is that the nitrogen oxides are only oxidized to nitrogen dioxide to a small degree in the course of diffusion through the second, upper functional layer. This can be attained through the use, according to the invention, of acidic support materials for the catalytically active platinum metals.

After the exhaust gas has diffused through the second functional layer it arrives at the first functional layer situated beneath with only a slightly increased proportion of nitrogen dioxide. Here the nitrogen monoxide which is contained in the exhaust gas is only loosely, physically adsorbed on the storage compounds.

The second functional layer accordingly contributes substantially to ensuring that the nitrogen oxides are only bound loosely in the first functional layer. Therefore, by way of nitrogen oxide storage compounds pertaining to the first functional layer all storage compounds known from the state of the art can be employed; that is to say, basic storage compounds of the alkali metal oxides, of the alkaline earth metal oxides and of the rare earth metals. Storage compounds of potassium, rubidium, caesium, magnesium, calcium, strontium and barium are preferably employed. In addition, the first functional layer may contain basic oxides of the transition metals from the group comprising manganese, cobalt, copper, zinc, tin, lead, zirconium, or combinations thereof.

The loose binding of the nitrogen oxides in the first functional layer may, however, also be assisted by a suitable choice of material. It has been found that storage compounds which are deposited on finely divided support materials based on cerium oxide only bind the nitrogen oxides loosely and that a perceptible desorption already sets in at relatively low exhaust gas temperatures.

Suitable as support materials in the working temperature range up to 400° C. which is of interest here and in the constantly lean exhaust gas conditions are pure cerium oxide and also doped cerium oxide and cerium/zirconium mixed oxides. Doped cerium oxide and cerium/zirconium mixed oxides are always to be preferred when the material is to be thermally stabilized against high exhaust gas temperatures of more than 400° C. which occur randomly. For at high exhaust gas temperatures there is the risk of the storage material reacting chemically with the support material and thereby losing its storage capability.

With a view to thermal stabilization, the cerium oxide may be stabilized by being doped with an oxide of the elements from the group constituted by silicon, scandium, yttrium and the rare earth metals (lanthanum, praseodymium, neodymium, promethium, samarium, europium, gadolinium, terbium, dysprosium, holmium, erbium, thulium, ytterbium and lutetium) or mixtures of their oxides. To this end, 0.5 to 20 wt.-%, preferably 5 to 10 wt.-%, of the respective oxide or of the oxide mixture are necessary. The concentration figure relates in this case to the total weight of the stabilized cerium oxide. Doping may be effected in accordance with processes known as such, such as co-precipitation, co-thermohydrolysis, impregnation and precipitation, for example.

The cerium/zirconium mixed oxides which are likewise preferably to be employed by way of support materials for the storage compounds are commercially available with a wide mixing ratio of cerium oxide to zirconium oxide and, just like pure cerium oxide, are in wide circulation as oxygen storage materials in conventional three-way catalysts. Production of the cerium/zirconium mixed oxides may, for example, be effected with the aid of mechanical mixing or impregnation and co-precipitation methods.

Within the scope of the present invention, the outstanding properties of these materials as support materials for the storage compounds are important. Their oxygen storage capability is of lesser significance.

Particularly favourable properties as support materials for storage compounds are exhibited by the cerium/zirconium mixed oxides when the content of zirconium oxide in the mixed oxide does not exceed 30 wt.-%, preferably 20 wt.-%, relative to the total weight of the mixed oxide. However, in order to impart good thermal stability to the cerium oxide, the content of zirconium oxide in the mixed oxide should not fall below 1 wt.-%. Zirconium oxide contents between 5 and 15 wt.-% are particularly advantageous. It has been possible to achieve very good results with a content of 10 wt.-% zirconium oxide. Above 30 wt.-% zirconium oxide the cerium oxide is no longer capable of shielding the zirconium oxide at high temperatures from a reaction with the storage components. A cerium/zirconium mixed oxide with 30 wt.-% zirconium oxide is therefore no longer suitable as support material for the storage compounds under operational conditions with high exhaust gas temperatures.

By virtue of the combination of the features according to the invention, the catalyst that has been described exhibits rates of conversion in respect of the nitrogen oxides in the oxygenous exhaust gas of diesel engines from 20 to 30%, averaged over practical driving cycles. In comparison with the state of the art these rates are therefore substantially increased. These rates of conversion are achieved without having to undertake a regeneration of the storage compounds in the rich exhaust gas mixture from time to time; that is to say, the engine can be operated continuously with a lean air/fuel mixture.

Furthermore, the combination according to the invention is distinguished by a very low working temperature range from 120 to 400° C. and shows, besides the relatively high conversion of nitrogen oxide which is observed, also very good conversions of carbon monoxide, hydrocarbons and particles.

Another advantage of the catalyst is its high resistance to contamination of the storage compounds by sulfur oxides. This resistance to contamination is founded on the acidic materials of the second functional layer, which suppress oxidation of the sulfur dioxide contained in the exhaust gas and form a diffusion barrier.

Referring now to the drawings, the two functional layers, a first functional layer 10 and a second functional layer 11, of the catalyst are applied, according to FIG. 1, onto an inert carrier body 12. By way of carrier body, use is made of the known honeycomb carrier bodies made of ceramic or metal which exhibit a plurality of flow channels for the exhaust gas over their cross-section. The coatings are applied by means of known processes onto the wall surfaces of the flow channels of the inert carrier. The cell density of these honeycomb bodies, that is to say the number of flow channels per unit cross-sectional area, may range from 10 to 200 $cm^{-2}$.

The coating concentration of the overall coating preferably range from 100 to 400 g/l of volume of the honeycomb body. At the same time, the proportion of the second functional layer with respect to the overall coating should constitute 10 to 50 wt.-%. If the proportion of the second functional layer exceeds 50 wt.-%, then the diffusion of the nitrogen oxides through this layer to the storage compounds of the first layer deteriorates to an increasing extent. If the proportion of the second functional layer is below 10 wt.-%, then its storage capacity for the hydrocarbons is no longer sufficient to make enough hydrocarbons available for subsequent reduction of the nitrogen oxides that are released.

For the catalytic activity of a coated catalyst body, in addition to the total mass of catalytically active substance its geometrical arrangement on the catalyst body is important. It has been shown that the catalytic activity of a catalyst for a specified amount of coating is generally higher if the coating is applied onto a larger geometrical surface. A larger geometrical surface can be provided either by virtue of a larger volume of the catalyst body or by virtue of a higher cell density. In the case of a conventional ceramic honeycomb body for catalysts having a cell density of 62 $cm^{-2}$ the ratio of its geometrical surface area $S_{cat}$ to the volume $V_{cat}$ amounts to about 2.4 $m^2/l$.

For the catalyst according to the invention the ratio of its geometrical surface to the swept volume $V_{swe}$ of the diesel engine should exhibit values from 1 to 10 $m^2/l$. Values below 1 $m^2/l$ generally provide inadequate catalytic activity. With increasing ratio of the geometrical surface of the catalyst to the swept volume, the purification of exhaust gas is improved. However, the improvements that can be achieved diminish with increasing ratio. For spatial reasons and also for cost reasons, therefore, ratios above 10 $m^2/l$ are not very sensible.

In the following Examples, catalysts according to the invention and comparison catalysts were applied on open-cell inert carrier bodies made of cordierite and having the dimensions given below:

| | |
|---|---|
| diameter | 14.37 cm |
| length | 15.24 cm |
| cell density | 62 $cm^{-2}$ |
| wall thickness | 0.2 mm |
| volume | 2.5 l |
| geometrical surface | 6 $m^2$ |

Preliminary Test

In a preliminary test the oxidation of nitrogen monoxide to nitrogen dioxide was investigated as a function of the formulation of the catalyst for the second functional layer. To this end, three honeycomb bodies were coated with the following catalyst formulations:

| | |
|---|---|
| 1st catalyst: | 100 g/l γγ-Al₂O₃ + 3.5 g/l Pt; The aluminum oxide had a specific surface area of 140 m²/g. Prior to the coating of the honeycomb body it was impregnated with a platinum salt solution and calcined for 4 hours at 300° C. |
| 2nd catalyst: | 100 g/l aluminum oxide doped with silicon (5 wt.-% SiO₂; 95 wt.-% Al₂O₃; 150 m²/g). Production was effected as in the case of the first catalyst. |
| 3rd catalyst: | 100 g/l aluminum oxide doped with silicon (40 wt.-% SiO₂; 40 wt.-% Al₂O₃; 150 m²/g). Production was effected as in the case of the first catalyst. |

Test specimens were drilled out of the three catalysts and were loaded in a synthesis gas plant with a synthetic exhaust gas mixture having the following composition:

| | |
|---|---|
| nitrogen monoxide | 270 vol.-ppm |
| propene | 90 vol.-ppm |
| carbon monoxide | 350 vol.-ppm |
| hydrogen | 116 vol.-ppm |
| sulfur dioxide | 20 vol.-ppm |
| oxygen | 6 vol.-% |
| water vapour | 10 vol.-% |
| carbon dioxide | 10 vol.-% |
| nitrogen | remainder |

The gas mixture was conveyed through the test specimens at a space velocity of 100,000 h⁻¹ and heated up from room temperature to 500° C. at a rate of 15° C./min. Downstream of the test specimens the concentration of the nitrogen dioxide which was formed was measured.

Figure 2:
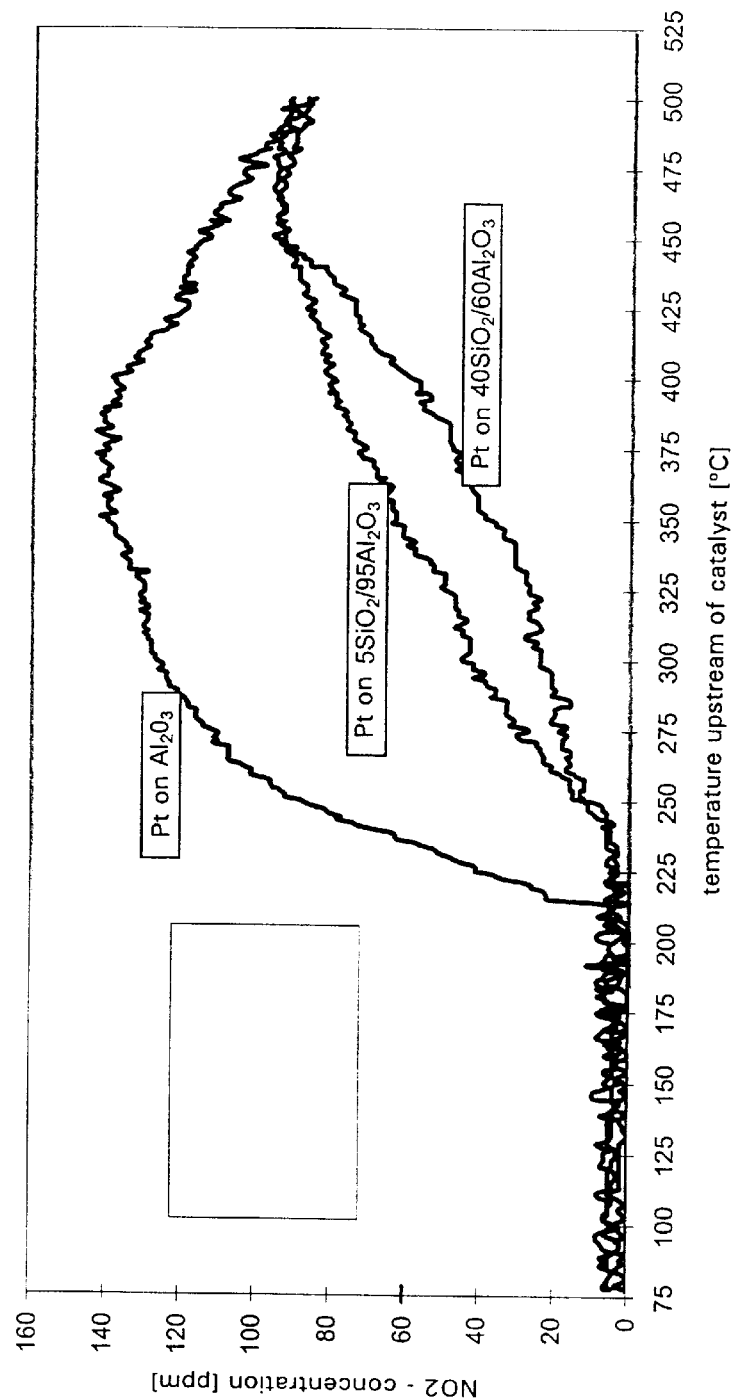
FIG. 2 is a graph representing the formation of nitrogen dioxide by the catalysts of the second functional layer.

FIG. 2 shows the plotted curves that were obtained. Below 200° C. nitrogen monoxide traverses the catalysts without being oxidized to nitrogen dioxide. Above about 210° C. in the case of Catalyst 1 with pure γ-aluminum oxide by way of support material for platinum the formation of nitrogen dioxide sets in.

Catalyst 2 with an aluminum oxide doped with 5 wt.-% silicon by way of support material exhibits a substantially lower tendency towards the formation of nitrogen dioxide. This may be ascribed to the higher acidity of this support material. A further diminution of the formation of nitrogen dioxide is observed in the case of Catalyst 3, the support material of which is even more acidic than the support material of Catalyst 2 by virtue of a content of 40 wt.-% silicon dioxide.

For the purposes of the present invention, pure aluminum oxide is therefore not very suitable as support material for the catalytically active component of the second functional layer. More favourable are the acidic support materials of Catalysts 2 and 3. They result in a diminished oxidative effect of the platinum on nitrogen monoxide. The nitrogen monoxide which is contained in the exhaust gas can accordingly traverse the second functional layer almost unchanged. In the first functional layer it is then loosely bound by physical adsorption.

COMPARATIVE EXAMPLE 1

A reduction catalyst analogous to Example 1 from DE 196 14 540 A1 was produced as follows.

Aluminum silicate with 5 wt.-% silicon dioxide (specific surface measured in accordance with DIN 66132: 286 m²/g) was activated with platinum. To this end, the aluminum silicate was brought into contact with an aqueous solution of tetrammineplatinum(II) hydroxide, subject to continual stirring, so that a moist, free-flowing powder was formed. After drying in air for twelve hours at 120° C., the powder which had formed was calcined in air for two hours at 300° C. Subsequently the powder was reduced at 500° C. for a period of two hours in the streaming forming-gas (95 vol.-% N₂ and 5 vol.-% H₂). The platinum/aluminum-silicate powder that was produced in this way contained, relative to its total weight, 3.4 wt.-% platinum.

From the preproduced platinum/aluminum-silicate powder an aqueous coating dispersion with a solids content of 40 wt.-% was prepared. To this dispersion the following zeolite powders were added in the ratio 1:1:1:1:1 : DAY (x=200), Na-ZSM-5 (x>1000), H-ZSM-5 (x=120), H-ZSM-5 (x=40) and H-mordenite (x=20).

The honeycomb body which was provided was coated by being immersed in this coating dispersion. The coating was dried in air at 120° C. and finally calcined for two hours at 500° C. The finished catalyst contained 140 g oxides and 3.18 g platinum per liter of catalyst volume.

The precise composition of the finished coating is shown in Table 1. The relative arrangement of the various components to one another is given by the following scheme:

| | | |
|---|---|---|
| Si/Al₂O₃ | + Pt | |
| H-mordenite | (x=20) | |
| H-ZSM5 | (x=40) | |
| | | overall coating |
| H-ZSM5 | (x=120) | |
| H-ZSM5 | (x>1000) | |
| DAY | (x=200) | |

COMPARATIVE EXAMPLE 2

A nitrogen oxide storage catalyst on a honeycomb body was produced as follows:

Aluminum oxide (specific surface area: 134 m²/g) was activated with platinum and palladium. To this end, the aluminum oxide was brought into contact with an aqueous solution consisting of tetrammineplatinum(II) nitrate and palladium(II) nitrate, subject to continual stirring, so that a moist platinum/palladium aluminum oxide powder was formed with a platinum content of 1.23 wt.-% and a palladium content of 0.71 wt.-%, in each case relative to the aluminum oxide. After drying in air for two hours at 120° C., the powder was calcined in air for a further two hours at 300° C. and subsequently reduced in the streaming forming gas at 500° C. for a period of two hours.

Furthermore, a cerium/zirconium mixed oxide (70 wt.-% cerium oxide; 30 wt.-% zirconium oxide; specific surface: 104 m²/g) was impregnated with rhodium. To this end, a rhodium(III)-nitrate solution was added, subject to continual stirring at a pH value of 6, to a dispersion of the mixed oxide with a solids content of 40 wt.-% during a period of 15 minutes. After a further 15 minutes the dispersion was filtered off. The solids were dried in air for two hours at 120° C. and calcined in air for four hours at 300° C. The rhodium-cerium/zirconium mixed-oxide powder that was produced in this way exhibited a rhodium content of 1.59 wt.-%, relative to the cerium/zirconium mixed oxide.

From the two preproduced powders an aqueous coating dispersion with a solids content of 40 wt.-% was prepared. In addition, magnesium acetate corresponding to a magnesium oxide proportion of 7.85 wt.-%, relative to the total solids content, was added.

The honeycomb body was coated by being immersed in this coating dispersion. The coating was dried in air at 120° C. and finally calcined for two hours at 500° C. After this, the coated honeycomb body was impregnated with an aqueous solution of barium acetate, dried again at 120° C. in a drying cabinet for two hours and subsequently calcined for two hours at 500° C.

The precise composition of the finished coating is shown in Table 1. The relative arrangement of the various components to one another is given by the following scheme:

| $Al_2O_3$ | + Pt + Pd | |
|---|---|---|
| | | + MgO + BaO |
| $Ce/ZrO_2$ | + Rh | |

EXAMPLE 1

A catalyst according to the invention with two functional layers was produced.

By way of first functional layer, the storage catalyst of Comparative Example 2 was applied. The oxide content was diminished proportionally by a factor of 0.78 in comparison with Comparative Example 2. The coating was dried in air at 120° C. and finally calcined for 2 h at 500° C.

By way of second functional layer, the reduction catalyst of Comparative Example 1 was applied. The oxide content was diminished in comparison with Comparative Example 1 by a factor of 0.71. The platinum loading of the second functional layer amounted to 3.18 g/l. The coating was dried in air at 120° C., calcined for four hours at 300° C. and finally reduced for two hours at 500° C. under forming gas.

EXAMPLE 2

Another catalyst according to the invention was produced.

By way of first functional layer, use was made of the storage catalyst of Comparative Example 2. The oxide content was diminished proportionally by a factor of 0.78 in comparison with Comparative Example 2. The coating was dried in air at 120° C. and finally calcined for two hours at 500° C.

The second functional layer was produced as follows:

A solids mixture consisting of 85 wt.-% aluminum silicate (5 wt.-% silicon dioxide; specific surface area: 147 $m^2/g$) and 15 wt.-% de-aluminized zeolite Y (x=200) was activated with platinum. To this end, the solids mixture was brought into contact with an aqueous solution of ethanolamineplatinum(IV) hydroxide, subject to continual stirring, so that a moist, free-flowing powder was formed. After drying in air for twelve hours at 120° C., the powder which had formed was calcined in air for four hours at 300° C. and reduced at 500° C. for a period of two hours under forming gas. The powder mixture that was activated in this way with platinum contained 2.65 wt.-% platinum, relative to the weight of the aluminum silicate.

By using this powder an aqueous coating dispersion with a solids content of 40 wt.-% was prepared. A honeycomb body was coated by being immersed in the coating dispersion. The coating was dried in air at 120° C., calcined for four hours at 300° C. and finally reduced for two hours at 500° C. under forming gas. The composition of the finished catalyst is shown in Table 1.

The relative arrangement of the various components of the second functional layer to one another is given by the following scheme:

| $Si/Al_2O_3$ | + Pt | |
|---|---|---|
| | | overall coating |
| DAY | (x=200) | |

Although the powder mixture was impregnated overall with platinum, the platinum was predominantly deposited only on the aluminum silicate.

EXAMPLE 3

Another catalyst according to the invention was prepared. The first functional layer was produced in the following way:

A zirconium dioxide powder (specific surface area: 103 $m^2/g$) was impregnated with 10.64 wt.-% $CeO_2$, 9.50 wt.-% $La_2O_3$ and 3.8 wt.-% Pd. To this end, an aqueous solution consisting of cerium(III) nitrate, lanthanum(III) nitrate and palladium(II) nitrate was applied with the appropriate weight ratios onto the zirconium dioxide powder, subject to continual agitation, so that a moist, impregnated zirconium dioxide powder was formed. After drying in air for two hours at 150° C., the powder which had formed was calcined in air for two hours at 600° C.

An aqueous coating dispersion with a solids content of 40 wt.-% was produced by using the impregnated zirconium oxide powder as well as aluminum oxide (specific surface area: 134 $m^2/g$) and cerium/zirconium mixed oxide (70/30; surface area: 104 $m^2/g$). The proportion of the zirconium oxide powder with respect to the dry mass of the coating dispersion amounted to 18.94 wt.-%, the proportion of aluminum oxide amounted to 57.64 wt.-% and the proportion of cerium/zirconium mixed oxide amounted to 10.80 wt.-%. In addition, barium acetate corresponding to a content of barium oxide amounting to 12.62 wt.-% was added to the dispersion.

As in the preceding Examples, a honeycomb body was coated with this coating dispersion, the coating was dried at 120° C. and finally calcined for a period of two hours at 500° C.

After this, the coated honeycomb body was impregnated with an aqueous solution consisting of magnesium nitrate and tetrammineplatinum(II) nitrate corresponding to 9.1 g/l magnesium oxide and 3 g/l platinum, dried at 120° C. and calcined for a period of two hours. By way of second functional layer, the second functional layer of Example 2 was applied. The composition of the finished catalyst coating is listed in Table 1.

The relative arrangement of the various components of the first functional layer to one another is given by the following scheme:

| $Al_2O_3$ | + BaO | |
|---|---|---|
| $ZrO_2$ + Pd + $CeO_2$ + $La_2O_3$ | + BaO | + MgO + Pt |
| $Ce/ZrO_2$ | + BaO | |

EXAMPLE 4

Another catalyst according to the invention was prepared. The first functional layer was produced in the following way:

The coating was produced by using three different oxidic powders. The three powders were:

Powder 1: aluminum oxide impregnated with platinum
Powder 2: cerium/zirconium mixed oxide impregnated with rhodium
Powder 3: cerium oxide impregnated with barium oxide Preparation of these three powders was undertaken as follows:

Powder 1:

Aluminum oxide (specific surface area 134 m²/g) was brought into contact, subject to continual agitation, with ethanolamineplatinum(IV) hydroxide, so that a moist, free-flowing powder was formed. After drying in air for twelve hours at 120° C., the powder which had formed was calcined in air for two hours at 300° C. Subsequently a reduction under forming gas was effected at 500° C. for a period of two hours. The platinum/aluminum oxide powder that was produced in this way contained 3.5 wt.-% platinum, relative to aluminum oxide.

Powder 2:

A dispersion with 40 wt.-% of a cerium/zirconium mixed oxide (70/30; 104 m²/g) was prepared. A rhodium(III)-nitrate solution with a pH value of 6 was stirred into this dispersion during a period of 15 minutes. After a further 15 minutes the dispersion was filtered off. The solids were dried in air for two hours at 120° C. and calcined in air for four hours at 300° C. The rhodium-cerium/zirconium-mixed oxide powder that was produced in this way exhibited a rhodium content of 1.59 wt.-%, relative to the mixed oxide.

Powder 3:

Cerium oxide (specific surface area 104 m²/g) was impregnated, subject to continual agitation, with an aqueous solution of barium acetate (15.48 wt.-% barium oxide), so that a moist, free-flowing powder was formed. After drying in air for twelve hours at 120° C., the powder was calcined in air for 2 h at 500° C.

From the 3 powders an aqueous coating dispersion with a solids content of 40 wt.-% was prepared. The proportion of Powder 1 with respect to the dry mass amounted to 40.50 wt.-%, the proportion of Powder 2 amounted to 8.6 wt.-% and the proportion of Powder 3 amounted to 50.9 wt.-%.

A honeycomb body was coated with this coating dispersion. The coating was dried in air at 120° C. and finally calcined for two hours at 500° C.

By way of second functional layer, the second functional layer of Example 2 was applied, as in Example 3. The precise composition of the finished coating is shown in Table 1.

The relative arrangement of the various components of the first functional layer to one another is given by the following scheme:

| | | |
|---|---|---|
| $Al_2O_3$ | + Pt | |
| $CeO_2$ | + BaO | first functional layer |
| $Ce/ZrO_2$ | + Rh | |

TABLE 1

Composition of the catalysts

| Raw material | Comparative Example 1 [g/l] | Comparative Example 2 [g/l] | Example 1 [g/l] | Example 2 [g/l] | Example 3 [g/l] | Example 4 [g/l] |
|---|---|---|---|---|---|---|
| second functional layer | | | | | | |
| aluminum silicate | 93.5 | — | 66.4 | 85.2 | 85.2 | 85.2 |
| H-mordenite (x = 20) | 9.3 | — | 6.6 | — | — | — |
| H-ZSM5 (x = 40) | 9.3 | — | 6.6 | — | — | — |
| H-ZSM5 (x = 120) | 9.3 | — | 6.6 | — | — | — |
| H-ZSM5 (x > 1000) | 9.3 | — | 6.6 | — | — | — |
| DAY (x = 200) | 9.3 | — | 6.6 | 14.2 | 14.2 | 14.2 |
| oxide content | 140 | — | 99.4 | 99.4 | 99.4 | 99.4 |
| platinum | 3.18 | — | 3.18 | 3.18 | 3.18 | 3.18 |
| first functional layer | | | | | | |
| aluminum oxide | — | 174 | 135.7 | 135.7 | 107.2 | 78 |
| zirconium dioxide | — | — | — | — | 26.8 | — |
| cerium oxide | — | — | — | — | 3.8 | 85.8 |
| cerium/zirconium mixed oxide | — | 22 | 17.2 | 17.2 | 20.1 | 16.9 |
| lanthanum oxide | — | — | — | — | 3.4 | — |
| barium oxide | — | 35 | 27.3 | 27.3 | 23.5 | 15.6 |
| magnesium oxide | — | 20 | 15.6 | 15.6 | 6.1 | |
| oxide content | — | 251 | 195.8 | 195.8 | 190.9 | 196.3 |
| platinum | — | 2.14 | 2.14 | 2.14 | 3 | 3.5 |
| palladium | — | 1.23 | 1.23 | 1.23 | 2 | |
| rhodium | — | 0.35 | 0.35 | 0.35 | | 0.35 |
| Total loading | | | | | | |

Utility Example 1

The catalytic activity of the catalysts for purification of exhaust gas that are specified in the above Examples was determined in a synthesis gas plant. With this plant it is possible to imitate all the gaseous exhaust gas components that are present in the real exhaust gas of a diesel engine or Otto engine. The chosen test conditions and the composition of the model gas are listed in Table 2.

Drilled cores of the corresponding catalysts with a diameter of 25 mm and a length of 76 mm were chosen as test pieces. With series connection of two test pieces the test pieces were halved, in order to keep the catalyst volume that was used for the investigation constant.

With a view to measuring the gaseous components contained in the exhaust gas, use was made of the measuring instruments specified in Table 3.

With a view to determining the kick-off temperatures, the exhaust gas was heated at a heat-up rate of 15° C./min. The test pieces were firstly conditioned for one hour at 400° C. in the exhaust gas mixture described in Table 6. The measured catalytic activities of selected catalyst combinations are recorded in Table 4.

TABLE 2

Test conditions and model gas composition for determining the rates of conversion of the harmful substances CO, HC and $NO_x$ in the synthesis gas plant.

| Component | Concentration |
|---|---|
| CO | 350 [vppm] |
| $H_2$ | 117 [vppm] |
| $HC_1$* | 270 [$ppmC_1$] |
| $SO_2$ | 20 [vppm] |
| NO | 270 [vppm] |
| $O_2$ | 10 [vol.-%] |
| $H_2O$ | 10 [vol.-%] |
| $CO_2$ | 10 [vol.-%] |
| $N_2$ | remainder |
| quantity of gas | 1,950 [Nl/h] |
| catalyst size | 25 mm × 76 mm |
| space velocity | 50,000 [$h^{-1}$] |
| heat-up rate | 15 [° C./min] |

$HC_1$* by way of hydrocarbon components, use was made of a mixture of propene and propane in a molar ratio of 1:1. The figures in Table 5 relate to a carbon atom.

TABLE 3

Tabulation of the measuring instruments for measuring the exhaust gas concentration in the synthesis gas test rig

| Analyzed gas | Measuring instrument | Manufacturer |
|---|---|---|
| $O_2$ | Oxymat | Siemens AG |
| hydrocarbon | FID | Pierburg Meβtechnik |
| $NO_x$ | CLD 700 Elht | Zellweger ECO-Systems |
| CO | Binos | Rosemount |
| $CO_2$ | Binos | Rosemount |
| $SO_2$ | Binos | Rosemount |

Utility Example 2

The catalytic activity of selected catalysts was additionally examined on a vehicle. A car with a 1.9 L DI engine and a rated power of 81 kW served as test vehicle. The vehicle rolling tests were carried out with a commercial diesel fuel which is prescribed in accordance with the Euro 2 Standard, having a sulfur content below 500 wt.-ppm. The analyzers that were used for determining the emissions of harmful substances corresponded to those of Utility Example 1 (see Table 3).

The results of these tests after ageing of the catalysts for a period of 6 hours at an exhaust gas temperature of 350° C. are listed in Table 5. The catalyst according to the invention as specified in Example 3 shows a lessening of the nitrogen oxides in comparison with the crude emission in the line "w/o cat." of about 25%, whereas the catalysts of Comparative Examples CE1 and CE2 lessen the nitrogen oxides by only about 13% in comparison with the crude emission.

TABLE 5

Harmful substance emissions in the MVEG-A test cycle after a six hour ageing of the engine of the catalysts at 350° C. in a car with a 1.9 L DI engine

| | | Emissions in the MVEG-A test cycle [g/km] | | | |
|---|---|---|---|---|---|
| Example | $O_{cat}/V_{swe}$ [$m^2$/l] | $NO_x$ | CO | HC | particles |
| w/o cat. | | 0.69 | 0.72 | 0.15 | 0.058 |
| CE1 | 6.32 | 0.62 | 0.13 | 0.02 | 0.038 |
| CE2 | 6.32 | 0.60 | 0.43 | 0.08 | 0.050 |
| E3 | 6.32 | 0.52 | 0.07 | 0.02 | 0.038 |

Further variations and modifications of the foregoing will be apparent to those skilled in the art and are intended to be encompassed by the claims appended hereto.

German priority application 198 54 794.3 is relied on and incorporated herein by reference.

We claim:
1. A catalyst for purifying exhaust gas of a diesel engine, comprising:
   a first functional layer, situated on a carrier body, comprising a nitrogen oxide storage compound selected from the group consisting of an alkali metal, an alkaline earth metal, and a rare earth metal; and

TABLE 4

Harmful substance conversion of the catalysts after conditioning in the synthesis gas for one hour at 400° C.

| Example | $NO_x$ temperature window [° C.] [1] | Temperature of the maximal $NO_x$ conversion [° C.] | maximal $NO_x$ conversion [%] | $T_{50,CO}$ [° C.] [2] | $T_{50,HC}$ [° C.] [3] |
|---|---|---|---|---|---|
| CE1 | 190–220 | 200 | 30 | 135 | 165 |
| CE2 | 180–220 | 205 | 35 | 185 | 198 |
| E1 | 161–242 | 193 | 52 | 152 | 178 |
| E2 | 165–245 | 194 | 53 | 150 | 173 |
| E3 | 167–250 | 195 | 57 | 148 | 176 |
| E4 | 160–270 | 180 | 60 | 144 | 174 |

[1] Catalysts based on noble metal exhibit a definite temperature range in which nitrogen oxides are converted. This range is designated as the temperature window. The temperature window in this Application Example is so defined that a 20-% conversion of $NO_x$ takes place at the temperature limits.
[2] Temperature at which 50% conversion of CO is obtained.
[3] Temperature at which 50% conversion of HC is obtained.

a second functional layer, in direct contact with the exhaust gas, comprising at least one zeolite having a hydrocarbon storage function, and having a catalytic function provided by at least one catalytically active noble metal of the platinum group which is deposited in highly dispersed form on at least one finely divided, acidic support material consisting of an aluminum silicate having a silicon dioxide content of from 1 to 40% relative to the total weight of the aluminum silicate.

2. The catalyst according to claim 1, wherein the at least one zeolite in the second functional layer is in acidic H-form, with a molar ratio of silicon dioxide to aluminum oxide of more than 20.

3. The catalyst according to claim 2, wherein the at least one zeolite in the second functional layer is a member selected from the group consisting of de-aluminized Y-zeolite, a zeolite ZSM-5, a de-aluminized mordenite, and mixtures thereof.

4. The catalyst according to claim 3, wherein the first functional layer additionally contains a basic oxide of a transition metal selected from the group consisting of manganese, cobalt, copper, zinc, tin, lead, zirconium, and mixtures thereof.

5. The catalyst according to claim 3, wherein the nitrogen oxide storage compound in the first functional layer is present in highly dispersed form on one or more support materials.

6. The catalyst according to claim 5, wherein, in the first functional layer, at least one of the support materials for the nitrogen oxide storage compounds is a support material based on cerium oxide.

7. The catalyst according to claim 1, wherein the first function layer additionally contains at least one catalytically active noble metal from the platinum group.

8. The catalyst according to claim 1, wherein the two functional layers are present on the inert carrier body in an overall concentration from 100 to 400 g/l.

9. The catalyst according to claim 5, wherein the proportion by weight of the second functional layer constitutes 10–50% by weight of the overall coating.

* * * * *